Aug. 26, 1969　　　　M. W. LESLIE　　　　3,463,614
METHOD AND APPARATUS FOR USE IN PROMOTING AGGLOMERATION
Filed Nov. 29, 1966
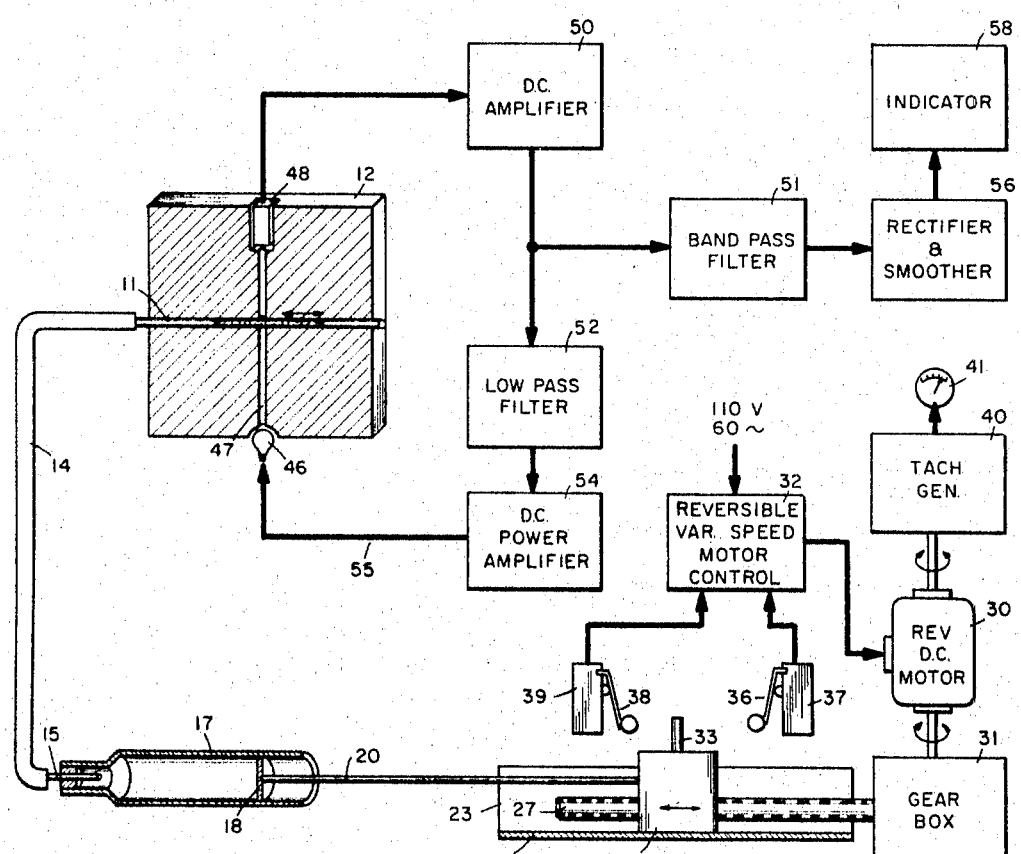
Fig. 1.
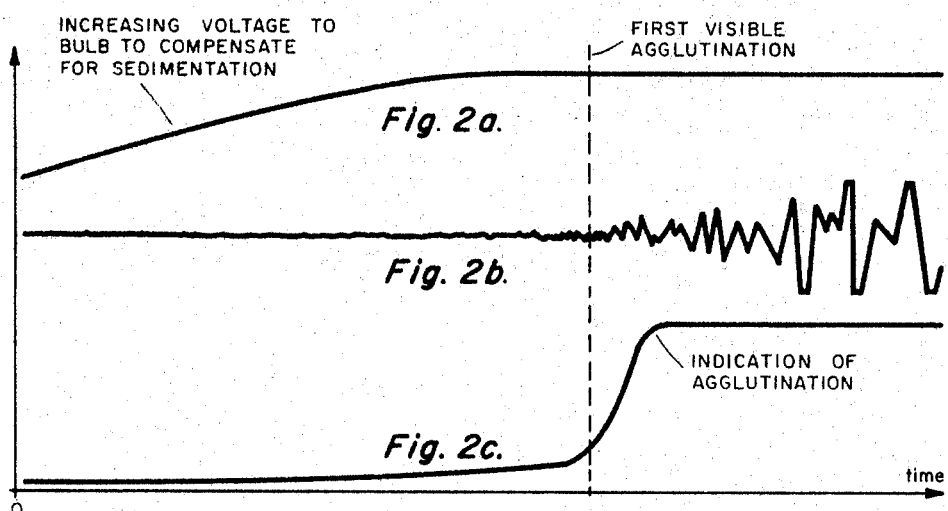
Fig. 2a.
Fig. 2b.
Fig. 2c.
INVENTOR.
MYRON W. LESLIE
BY Henry Huff
ATTORNEY.

United States Patent Office 3,463,614
Patented Aug. 26, 1969

3,463,614
METHOD AND APPARATUS FOR USE IN
PROMOTING AGGLOMERATION
Myron W. Leslie, Westbury, N.Y., assignor to Cutler-Hammer, Inc., Milwaukee, Wis., a corporation of Delaware
Filed Nov. 29, 1966, Ser. No. 597,614
Int. Cl. G01n 31/00
U.S. Cl. 23—230          13 Claims

ABSTRACT OF THE DISCLOSURE

Method and apparatus for inducing and detecting agglomeration in certain fluid substances, particularly enhancing and intensifying the agglomeration action and requiring but a very small quantity of the fluid substance.

Background of the invention

In certain test procedures, particularly in the field of the biomedical sciences, the presence or absence of an agglutination action or reaction in a fluid substance is the indication which is looked for to identify or characterize the substance, or a constituent of the substance. For example, the presence or absence of agglutination is looked for in such tests as the latex sphere agglutination test to determine human pregnancy, and in various seriological tests such as those conducted to test for infectious mononucleosis and syphillis. It is in the field of blood grouping, typing, atypical antibody screening, and cross-matching that the rapid and enhanced inducement and detection of aggutination is particularly important because in cases of medical emergencies it may be required that a blood be accurately identified and its compatibility with other blood be determined as quickly as possible.

As used herein the word agglomeration is a generic word whose meaning is broader than, and inclusive of, the meaning of the word agglutination.

Summary of the invention

It is an object of this invention to provide a method and apparatus that enhances the agglomeration action or reaction that occurs in certain fluid substances.

Another object of this invention is to provide a method and apparatus for performing a sensitive agglutination test with a relatively small quantity of a fluid substance.

A further object of this invention is to provide a method and apparatus for increasing the accuracy and rapidity with which the antigen and/or antibody constituents of blood may be identified, and for performing compatibility tests on different blood samples.

Another object of this invention is to provide a method and apparatus for enhancing the aggutination of red blood cells while testing a blood sample.

In accordance with a preferred embodiment the present invention which has been used for testing blood, agglutination of the red blood cells of a blood sample may be quickly and accurately detected by filling a capillary tube to approximately two-thirds its capacity with a prescribed fluid mixture of red blood cells and a known reagent which may or may not cause agglutination of the red blood cells. The fluid is then caused to reciprocate within the substantially horizontally disposed capillary tube. The red blood cells settle to the lower surface of the capillary tube and form a loose sediment that reciprocates within the tube, thereby providing greater opportunity for contact between the red blood cells. If agglutination is to occur, the action just described enhances it and clumps of red blood cells form within the capillary tube. The presence of these clumps may be detected by directing a thin beam of light transversely through the capillary tube and detecting by photoelectric means the modulation of the light beam caused by the reciprocating clumps of red blood cells. Suitable means may be provided to give an indication that agglutination is present.

Brief description of the drawings

FIG. 1 is a simplified illustration, partially in block diagram form, of apparatus for carrying out the present invention, and;

FIGS. 2a–2c are a series of approximate waveforms that are used in describing the operation of the electrical portion of the apparatus illustrated in FIG. 1.

Description of the preferred embodiments

In describing the present invention, its use in producing agglutination of red blood cells will be described. It is to be understood that this is presented by way of example only and is not intended to imply a limitation on the usefulness of the invention.

Referring now in detail to FIG. 1 of the drawings, a capillary tube 11 which is open at both ends is disposed within a horizontally-extending bore within a fixed block 12 of a heat conducting material such as aluminum. Capillary tube 11 is partially filled with a prescribed mixture of a suspension of red blood cells with one or more serums, biological reagents, etc., whose reactions, if any, are to be observed and detected, as will be explained in more detail below. Means (not illustrated) are provided for maintaining block 12, and in turn the fluid in tube 11, at a desired temperature. The left end of capillary tube 11 is disposed within an end of a flexible tubing 14 whose other end is connected to a tube 15 which passes through the closed end of an air filled cylinder 17. A piston 18 is in sliding engagement with the inner surface of cylinder 17 and is connected to a push rod 20 whose right end is secured to a translatable block 22 which is disposed within a way comprised of a back wall 23 and a bottom 24. Block 22 is restrained from rotating but is permitted to freely translate in the horizontal direction. Block 22 has a central threaded aperture that engages the screw 27 which rotates in response to a reversible D.C. motor 30 which acts through a speed-reducing gear box 31. The speed of revolution of reversible D.C. motor 30 is controlled by a reversible, variable-speed motor control unit 32 which is excited by a 60 cycle 110 volt supply. The r.p.m. of motor 30 is monitored by tachometer generator 40 and a meter 41. As block 22 moves in the horizontal direction from left to right in response to rotating screw 27, the vertically projecting peg 33 on the top of block 22 engages the contact 36 of reversing switch 37 which functions to send a reversing signal to motor control unit 32 which responds thereto to cause the exciting voltage to D.C.

motor 30 to reverse in direction, thus reversing the direction of rotation of D.C. motor 30 and screw 27. Block 22, push row 20, and piston 18 then commence to travel in the opposite direction from right to left until peg 33 engages contact 38 of a second reversing switch 39. Switch 39 responds in the same manner described with regard to switch 37 to cause motor 30 to again change its direction of rotation so that block 22, push rod 20 and piston 18 again travel from left to right. In this manner piston 18 is caused to move back and forth with a fixed velocity over a fixed length of stroke.

As piston 18 reciprocates within cylinder 17 it alternately pushes and pulls a volume of air within flexible tube 14 and capillary tube 11, thus drawing back and forth within capillary tube 11 the volume of fluid disposed therein. The fluid mixture within capillary tube 11 moves as a unitary body, i.e., as a fluid piston, and this feature is essential to the practice of the present invention. This type of action in the horizontally disposed capillary tube requires that the fluid completely fill the cross sectional area of the tube throughout a distance less than the full length of the tube. It is for this reason that a capillary tube is required. Of course most tubes will exhibit some capillary action, but as the term is used herein it implies a small bore tube of internal diameter no larger than several millimeters which will permit the fluid mixture to reciprocate within the horizontal tube in the manner of a fluid piston, as described above.

In describing a typical use of the apparatus thus far described, and the type of reaction that might occur within the horizontal capillary tube 11, it will be assumed that the object of a test being conducted is to determine the Rh type of a blood sample. The fluid that is to partially fill capillary tube 11 is a mixture of two parts of a five percent saline or serum suspension of washed red blood cells and two parts of a suitable anti-D typing serum, a number of which are commercially available. These two fluids are mixed together in a test tube and then capillary tube 11 is immersed in the mixture and is allowed to fill about two-thirds of the way up the tube due to capillary action, care being exercised to assure that no air bubbles are present between the menisci at the two ends of the fluid.

Capillary tube 11 is inserted into the end of flexible tubing 14 and is placed in the horizontally-extending aperture of fixed block 12 whose temperature is controlled by conventional means not illustrated. D.C. motor 30 then is energized, and through the action of the mechanism previously described, piston 18 reciprocates within cylinder 17 to cause the fluid to reciprocate within capillary tube 11, the stroke of mechanical piston 18 and the location of the fluid wtihin the tube being adjusted to assure that the fluid does not reach the open ends of the capillary tube. Because the red blood cells are more dense than their suspending fluid they slowly settle to the lower surface of the capillary tube and form a loose sediment which is impelled back and forth by the reciprocating action of the moving fluid. This action enhances contact between and agglutination of the red blood cells, if agglutination in fact is to occur with the particular fluid mixture in the capillary tube, and provides a very sensitive agglutination test.

The conditions and parameters which have been found to be optimum for performing a sensitive agglutination test are the following. A commercially available capillary tube 1.0 millimeter in diameter and 75 millimeters long is filled throughout approximately two-thirds of its length with a mixture of the type described above in which the red blood cells constitute between 1.25 to 5.0 percent by volume of the fluid. Acceptable results were obtained with capillary tubes whose diameters ranged from approximately 0.5 to 2.0 millimeters. The length of the fluid stroke was approximately 19 millimeters (.75 inch), and optimum fluid speed was approximately 100 millimeters (4.0 inches) per minute, although it may range from 3.5 inches per minute to 5.0 inches per minute. These parameter values are not considered critical but optimum results have been obtained with the specific values indicated.

In accordance with the present invention, the presence of agglutinated red blood cells within capillar tube 11 is detected by means of a photo-electronic arrangement that includes a light bulb 46 and a light detector such as a photo diode 48. In the illustrated embodiment light elements are disposed at opposite ends of a vertically extending aperture 47 that intersects the horizontal aperture containing capillary tube 11. Vertical aperture 47 has a diameter that is smaller than that of the capillary tube so that when light bulb 46 is lit a thin beam of light is projected transversely through the capillary tube to photo diode 48. Vertical aperture 47 is centered in block 12 and the stroke of the reciprocating fluid is adjusted so that the menisci of the fluid never intercept the light beam.

As the fluid reciprocates within capillary tube 11 the red blood cells begin to settle out to form the loose sediment on the lower surface of the capillary tube, as previously described, and the light that is projected through capillary tube 11 is diminished by the sediment so that the magnitude of the output voltage from photo diode 48 diminishes in like manner. The output voltage from photo diode 48 is coupled to the electronic agglutination detection circuitry that is represented in block form in the upper portion of FIG. 1. The electronic circuitry is comprised of an agglutination signal path that is comprised of D.C. amplifier 50, bandpass filter 51, rectifier and smoother circuit 56, and a suitable indicator 58. A sedimentation signal path is comprised of D.C. amplifier 50, low-pass filter 52, and a D.C. power amplifier 54 whose output is connected through lead 55 to the light bulb 46. Bandpass filter 51 has characteristics that are chosen to pass only the alternating signal components that are induced by reciprocating agglutinated red blood cells within capillary tube 11. Other more slowly varying signal components are not passed by bandpass filter 51. The very slowly varying signal component that arises due to the decrease in light transmission through capillary tube 11 resulting from sedimentation is passed through low pass filter 52. The output signal of low pass filter 52 is a smoothed or averaged signal, FIG. 2a, which is applied as an input control signal to D.C. power amplifier 54. Power amplifier 54 produces an output signal which increases in magnitude as its input signal decreases due to the sedimentation forming on the bottom surface of capillary tube 11. The output signal of power amplifier 54 is coupled over the lead 55 to light bulb 46 to cause the bulb to burn with increased brightness. The parameters of the circuit just described are proportioned so that in general the level of intensity of the light falling on diode 48 remains substantially constant despite the sediment being formed in the capillary tube.

As the red blood cells begin to clump or agglutinate, which might occur within a time period of from a fraction of a minute to twenty minutes, the increased size of these clumps present distinct obstacles to the transmission of the light path. As a result of this type of action, the in- the fluid within capillary tube 11 is reciprocating, the clumps that are forming within the tube move through the light beam and represent transistory obstructions in the light path. As a result of this type of action, the instantaneous intensity of the light falling on photo diode 48 will vary as a funcion of the number of clumps and of the rate of travel of the clumps through the light beam. The characteristics of the output signal of photo diode 48 during the agglutination of the red blood cells are illustrated in the right hand portion of the waveform of FIG. 2b, this waveform having been clipped at both the positive and negative extremities by conventional circuitry that is not illustrated. It may be seen that the waveform of FIG. 2b has taken on an alternating component of some irregular but finite frequency. This A.C. component is blocked by low-pass filter 52, is passed through bandpass filter 51, whose characteristics are chosen to optimize the signal-to-noise ratio for the desired signal, and the filtered signal then is rectified and smoothed by circuit 56 to provide a D.C. signal, FIG. 2c, whose magnitude is a function of the size distribution and number of red blood cell clumps that are formed within capillary tube 11. Some suitable indicator means 58 is provided to give a visual or audible indication that agglutination has formed within capillary tube 11.

The object of the test described above was to identify the Rh type of a blood sample. Other types of tests may be performed by the method and with apparatus similar to that described above, the necessary blood or blood constituent, and serum, antiserum, or other desired fluid substances being utilized. As it is used herein and in the claims that follow, the term reagent is intended to include any material or substance that is included in a fluid substance for the purpose of conducting a test.

One particularly advantageous feature of the present invention is that only a very small quantity of blood or other substance to be tested is required since the capacity of a capillary tube is quite small.

It will be obvious to those skilled in the art that a plurality of tests could be conducted at the same time by employing the method and apparatus described above. For example, a plurality of capillary tubes could be mounted side by side in a suitable fixture and connected in parallel to a pneumatic source to produce the reciprocating motion of the respective fluid mixtures within the plurality of capillary tubes. The tubes all could contain a sample of the same substance to be tested but the respective tubes would contain different reagents so that different basic tests could be performed in different tubes. Alternatively, each of the tubes could be filled with a different substance with the same reagent being contained in each of the tubes, thereby to perform the same test upon different samples.

It also will be obvious that the enhanced agglutinating action that is achieved by the practice of this invention may be accomplished with apparatus that is simpler than that illustrated in the accompanying drawings. For example, the flexible tube 14 that is connected at one end to capillary tube 11 could be connected at its other end to a squeeze bulb that may be hand-activated to produce the alternating change in pneumatic pressure at an end of the capillary tube. In this instance the capillary tube may be visually observed for evidence of agglutination. This apparatus would be extremely simple, quite inexpensive, and readily transportable. Furthermore, means other than pneumatic means may be utilized to produce the reciprocating action of the fluid in the capillary tube.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. A method for detecting agglomeration within a fluid substance comprising the steps
  completely filling the cross sectional area of a capillary tube with said fluid substance throughout a distance less than the full length of said tube,
  maintaining said capillary tube substantially horizontal,
  reciprocating said fluid substance as a fluid piston within said capillary tube to induce agglomeration, and
  examining said fluid substance for evidence of agglomeration.

2. The method claimed in claim 1 wherein the reciprocating motion of the fluid substance is at a velocity sufficiently low to permit agglomerated substance to settle to the lowest portion of the capillary tube and sufficiently high to cause said agglomeration to reciprocate within said tube as the fluid substance is reciprocated therein.

3. The method claimed in claim 2 wherein
  said capillary tube is fixed in position and,
  said fluid substance is reciprocated within the capillary tube by applying varying pneumatic pressure at one end of said capillary tube.

4. The method claimed in claim 2 wherein,
  the displacement of said fluid substance while reciprocating within said capillary tube is approximately .75 inch.

5. The method claimed in claim 2 wherein,
  the rate of translation of said fluid substance while reciprocating within said capillary tube ranges from approximately 3.5 to 5.0 inches per minute.

6. The method claimed in claim 2 wherein said agglomeration is an agglutination.

7. The method claimed in claim 6 wherein,
  a region of said capillary tube is continuously filled by the fluid substance while it is reciprocating within said tube.

8. The method claimed in claim 7 wherein,
  said examination of the fluid substance comprises the steps of
  projecting a beam of energy through said region of the capillary tube continuously filled by the fluid substance, and
  monitoring said beam while said fluid substance is reciprocating within said capillary tube.

9. The method claimed in claim 8 wherein the step of monitoring said beam includes
  detecting said beam and producing a corresponding signal,
  said corresponding signal including an alternating frequency component that results from reciprocating agglutination passing through said beam,
  separating said alternating frequency component from said corresponding signal, and
  providing some indication in response to a given characteristic of said separated alternating frequency component.

10. Apparatus for testing for agglomeration in a fluid substance, comprising
  a capillary tube adapted to maintain a sample of such fluid substance in the form of a fluid piston completely filling the cross sectional area of said tube throughout a portion of the length of said tube,
  means for supporting said tube in a substantially horizontal position,
  means for applying a cyclically varying pneumatic pressure to one end of said tube to produce reciprocating motion of such fluid piston with an amplitude such that at least a part of said tube remains continuously filled with such fluid substance, and
  means responsive to variation of the transmissibility of light through said part of said tube for detecting agglomeration therein.

11. The apparatus claimed in claim 10 where the means for detecting the presence of agglomeration includes
  means for directing a beam of energy transversely through the region of said tube that is continuously filled by the fluid substance,
  means responsive to the beam of energy transmitted through the tube and producing a signal that includes an alternating component corresponding to the change in instantaneous intensity of the beam resulting from reciprocating agglomeration passing through said beam, and
  means responsive to said alternating component for providing an indication of agglomeration in said capillary tube.

12. The apparatus claimed in claim 11 wherein the means responsive to the alternating component includes, filter means for separating said alternating component from said signal.

13. The apparatus claimed in claim 12 and further including low-pass filter means for passing a slowly varying component of said signal, and means responsive to said slowly varying component for controlling the intensity of said beam of energy to maintain the general intensity of said beam substantially constant.

References Cited

UNITED STATES PATENTS

| 2,102,785 | 12/1937 | Brooks | 23—253 XR |
| 2,379,158 | 6/1945 | Kalischer | 23—253 XR |
| 3,310,292 | 3/1967 | Moore | 259—72 |

MORRIS O. WOLK, Primary Examiner

R. E. SERWIN, Assistant Examiner

U.S. Cl. X.R.

23—253; 356—223